(12) United States Patent
Zhang et al.

(10) Patent No.: US 11,204,529 B2
(45) Date of Patent: Dec. 21, 2021

(54) DISPLAY PANEL AND METHOD FOR MANUFACTURING THE DISPLAY PANEL

(71) Applicant: BOE TECHNOLOGY GROUP CO., LTD., Beijing (CN)

(72) Inventors: Shunhang Zhang, Beijing (CN); Shiyu Zhang, Beijing (CN); Yoonsung Um, Beijing (CN); Yunsik Im, Beijing (CN); Feng Liao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/642,210

(22) PCT Filed: Mar. 21, 2019

(86) PCT No.: PCT/CN2019/078995
§ 371 (c)(1),
(2) Date: Feb. 26, 2020

(87) PCT Pub. No.: WO2019/179484
PCT Pub. Date: Sep. 26, 2019

(65) Prior Publication Data
US 2020/0355967 A1    Nov. 12, 2020

(30) Foreign Application Priority Data

Mar. 22, 2018 (CN) .......................... 201810241784.5

(51) Int. Cl.
*G02F 1/1343* (2006.01)
*G02F 1/1335* (2006.01)
(Continued)

(52) U.S. Cl.
CPC ...... *G02F 1/134309* (2013.01); *G02F 1/1339* (2013.01); *G02F 1/1341* (2013.01);
(Continued)

(58) Field of Classification Search
CPC ............. G02F 1/133788; G02F 1/1337; G02F 1/133707–133761; G02F 1/134363
See application file for complete search history.

(56) References Cited

U.S. PATENT DOCUMENTS

2001/0019387 A1* 9/2001 Nakasogi .............. G02F 1/1393
349/123
2008/0284959 A1* 11/2008 Yang .................... C09K 19/348
349/126

(Continued)

FOREIGN PATENT DOCUMENTS

CN   101464585 A   6/2009
CN   102023421 A   4/2011
(Continued)

OTHER PUBLICATIONS

First Office Action and English language translation, CN Application No. 201810241784.5, dated Mar. 4, 2020, 13 pp.

*Primary Examiner* — Edward J Glick
*Assistant Examiner* — Jonathan Y Jung
(74) *Attorney, Agent, or Firm* — Myers Bigel, P.A.

(57) ABSTRACT

A display panel and a method for manufacturing a display device are provided. The display panel includes an array substrate, a color film substrate assembled with the array substrate, and liquid crystal molecules sealed between the array substrate and the color film substrate. The array substrate comprises a pixel electrode and a common electrode, orthographic projections of the pixel electrode and the common electrode on the base substrate of the array substrate have an overlapping region, and the liquid crystal molecules have an azimuth angle of 90 degree. As a result, the display panel can have a faster response speed and is applicable to scenarios that require fast and frequent image switching.

16 Claims, 4 Drawing Sheets

(51) Int. Cl.
*G02F 1/1339* (2006.01)
*G02F 1/1341* (2006.01)
*G02F 1/137* (2006.01)
*G02F 1/1333* (2006.01)
*G02F 1/1337* (2006.01)

(52) U.S. Cl.
CPC .. *G02F 1/133345* (2013.01); *G02F 1/133514* (2013.01); *G02F 1/137* (2013.01); *G02F 1/1337* (2013.01); *G02F 1/133357* (2021.01); *G02F 1/133707* (2013.01); *G02F 1/133761* (2021.01); *G02F 1/133788* (2013.01); *G02F 1/134345* (2021.01); *G02F 1/134363* (2013.01); *G02F 2201/121* (2013.01); *G02F 2201/123* (2013.01)

(56) References Cited

U.S. PATENT DOCUMENTS

| | | |
|---|---|---|
| 2013/0083244 A1 | 4/2013 | Hosaka et al. |
| 2013/0229588 A1* | 9/2013 | Nishida .................. G02F 1/137 349/33 |
| 2014/0049741 A1* | 2/2014 | Dong ................. G02F 1/134309 349/143 |
| 2016/0231469 A1 | 8/2016 | Asaoka et al. |
| 2017/0115527 A1* | 4/2017 | Kita .................. G02F 1/133528 |
| 2017/0358270 A1* | 12/2017 | Hsu .................. G02F 1/133512 |
| 2019/0285918 A1 | 9/2019 | Li et al. |
| 2019/0384123 A1 | 12/2019 | Wang |

FOREIGN PATENT DOCUMENTS

| | | |
|---|---|---|
| CN | 202025168 U | 11/2011 |
| CN | 102622977 A | 8/2012 |
| CN | 102636921 A | 8/2012 |
| CN | 202600317 U | 12/2012 |
| CN | 103018965 A | 4/2013 |
| CN | 103592792 A | 2/2014 |
| CN | 104007588 A | 8/2014 |
| CN | 106647048 A | 5/2017 |
| CN | 107632469 A | 1/2018 |
| CN | 108398834 A | 8/2018 |
| WO | 2015/045838 A1 | 4/2015 |

* cited by examiner

DISPLAY PANEL AND METHOD FOR MANUFACTURING THE DISPLAY PANEL

RELATED APPLICATION

The present application is a 35 U.S.C. 371 national stage application of a PCT International Application No. PCT/CN2019/078995, filed on Mar. 21, 2019, which claims the benefit of Chinese Patent Application No. 201810241784.5 filed with the Chinese Patent Office on Mar. 22, 2018, the entire disclosures of which are incorporated herein by reference.

TECHNICAL FIELD

The present disclosure relates to the field of display technologies, and specifically to a display panel and a method for manufacturing the display panel.

BACKGROUND

Liquid crystal display devices have been widely used in people's daily work and life. With the development of display technologies, users' requirements on liquid crystal display devices also increase accordingly. For example, a faster response speed is desired in case of image switching. For an existing liquid crystal display device, the response speed upon image display still needs to be improved.

SUMMARY

According to an aspect of the present disclosure, there is provided a display panel comprising: an array substrate; a color film substrate assembled with the array substrate; and liquid crystal molecules sealed between the array substrate and the color film substrate. The array substrate comprises a pixel electrode and a common electrode, orthographic projections of the pixel electrode and the common electrode on a base substrate of the array substrate comprises an overlapping region, and an azimuth angle of the liquid crystal molecules is 90 degree.

In some embodiments, the base substrate of the array substrate comprises a plurality of sub-pixel regions arranged in an array, the common electrode comprises a plurality of electrode blocks, and each of the plurality of sub-pixel regions is provided with one pixel electrode and at least two electrode blocks.

In some embodiments, the pixel electrode is a plate-like electrode, the electrode block is a strip electrode, and orthographic projections of the at least two electrode blocks on the base substrate are located at edges of the sub-pixel region and fall within an orthographic projection of the pixel electrode on the base substrate.

In some embodiments, t the base substrate of the array substrate comprises a plurality of sub-pixel regions arranged in an array, the common electrode comprises a plurality of electrode blocks, each of the sub-pixel regions is provided with one pixel electrode and one electrode block, and each electrode block comprises at least one hollow portion.

In some embodiments, outer edges of orthographic projections of portions other than the hollow portion of each electrode block on the base substrate are located at edges of the sub-pixel region and fall within an orthographic projection of the pixel electrode on the base substrate.

In some embodiments, the common electrode and the pixel electrode are on a same side of the base substrate of the array substrate.

In some embodiments, the common electrode and the pixel electrode are located on a side of the base substrate facing the liquid crystal molecules, the pixel electrode is closer to the base substrate than the common electrode, and an insulating planarization layer is arranged between the common electrode and the pixel electrode.

In some embodiments, a pretilt angle of the liquid crystal molecules is in a range of 85 to 90 degree.

Another embodiment of the present disclosure provides a display device comprising the display panel according to any one of the foregoing embodiments.

A further embodiment of the present disclosure provides a method for manufacturing a display panel, comprising: providing a color film substrate and an array substrate, the array substrate comprising a pixel electrode and a common electrode; and assembling the array substrate with the color film substrate and filling liquid crystal molecules between the array substrate and the color film substrate. An azimuth angle of liquid crystal molecules is 90 degree.

In some embodiments, a pretilt angle of the liquid crystal molecules is in a range of 85 to 90 degree.

BRIEF DESCRIPTION OF THE DRAWINGS

The above and/or additional aspects and advantages of the present disclosure will become apparent and easily understood from the description of embodiments in conjunction with the following drawings in which.

DETAILED DESCRIPTION OF EMBODIMENTS

Hereinafter, embodiments of the present disclosure will be described in detail. Examples of the embodiments are shown in the accompanying drawings, and the same or similar reference numerals represent the same or similar elements or elements having the same or similar functions throughout the specification. The embodiments described below with reference to the drawings are exemplary, which are only used to explain the present disclosure, and should not be construed as limiting the scope of the present application.

In the description of the disclosure, the orientations or positional relationships indicated by the terms such as "above" or "upper", "lower" or "below", and the like are based on the orientations or positional relationships shown in the drawings, which are merely for the convenience of describing the exemplary embodiments of the present disclosure rather than requiring the embodiments of the present disclosure to be constructed and implanted in a particular orientation, and therefore cannot be construed as limiting the scope of the present application.

In an aspect of the present disclosure, a display panel is proposed. According to an embodiment of the present disclosure, referring to FIG. 1, the display panel comprises an array substrate, a color film substrate 200, and liquid crystal molecules 300 sealed between the array substrate and the color film substrate. The array substrate comprises a substrate 100, and a pixel electrode 110 and a common electrode 120 disposed on the substrate 100. The orthographic projections of the pixel electrode 110 and the common electrode 120 on the substrate 100 have an overlapping region, and the liquid crystal molecules 300 have an azimuth angle of 90 degree. As will be further described in detail below, the display panel provided by the embodiment of the present disclosure may have a faster response speed, which may be applicable to scenarios that require fast and frequent image switching.

Figure 2:
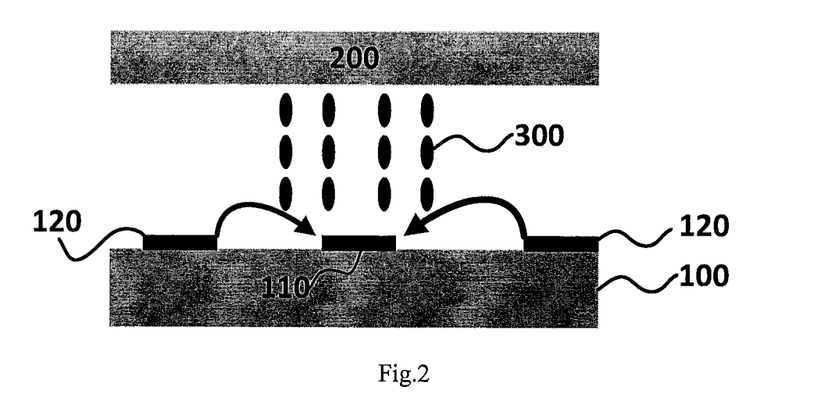
FIG. 2 is a partial structural view of a display panel according to another example of the present disclosure.

Referring to FIG. 2, it illustrates a display panel based on VA-IPS (In-Plane Switching Technology) according to an embodiment of the present disclosure. The liquid crystal molecules in the VA-IPS-based display panel have a fast response speed. An array substrate 100 comprises a common electrode 120 and a pixel electrode 110. The common electrode 120 and the pixel electrode 110 are on the same plane. When the display panel is in operation, the direction of the electric field formed by the common electrode 120 and the pixel electrode 110 is shown by the arrows in FIG. 2. Therefore, in order to drive the liquid crystal molecules 300 on the array substrate to be deflected, the distance between the common electrode and the pixel electrode needs to be within a certain range. Those skilled in the art can understand that, the smaller the distance between the common electrode and the pixel electrode is, the lower the transmittance of the display panel will have. In particular, in case a pixel structure with PPI is required, the transmittance of the display panel will be very low. Moreover, due to the restriction by the direction of the electric field between the common electrode and the pixel electrode, the liquid crystal molecules right above the common electrode or the pixel electrode may not be deflected.

Figure 3:
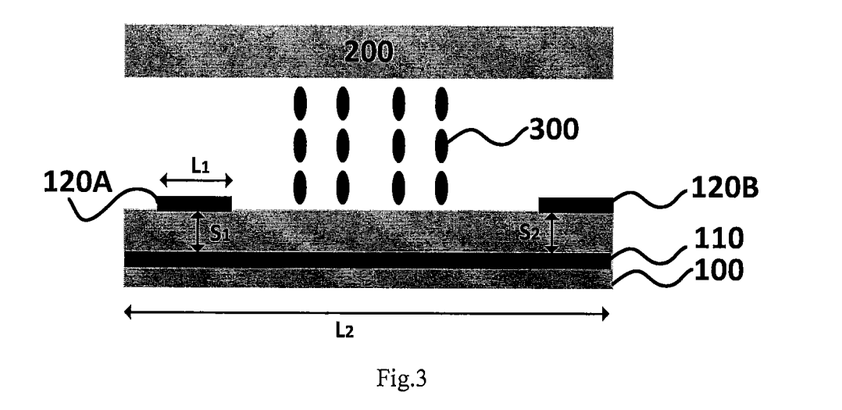
FIG. 3 is a partial structural view of a display panel according to an embodiment of the present disclosure.

Referring to FIG. 3, it illustrates a schematic view of a display panel according to another embodiment of the present disclosure. The embodiment shown in FIG. 3 is a liquid crystal display device based on an Advanced Super Dimension Switch (ADS) technology. The ADS-based liquid crystal display device can achieve a higher light transmission efficiency, a wider viewing angle, and a higher definition.

For the liquid crystal display panel shown in the embodiment of FIG. 3, the orthographic projections of the common electrode 120 (120A and 120B as shown in the figure) and the pixel electrode 110 on the substrate 100 of the array substrate have an overlapping region. Thus, when the display panel is in operation, the electric field formed by the common electrode and the pixel electrode can drive the liquid crystal molecules right above the common electrode or the pixel electrode easily. Moreover, compared with the display panel shown in FIG. 2, the limitation on the distance between adjacent electrodes on the array substrate of the display panel provided by this embodiment is reduced. Therefore, even if in case of a display panel requiring high PPI, a high transmittance may be achieved.

The inventors of the application have found that, for a liquid crystal display panel having such common electrodes and pixel electrodes, the response speed upon image switching is still slow. In this regard, the inventors of the present application have realized through research that this is largely caused by the manner in which liquid crystal molecules in the display panel are deflected. The liquid crystal molecules in the display panel usually transfer from an initial state (e.g., a state of being arranged in the horizontal direction) when the liquid crystal molecules are arranged parallel to a rubbing direction for the alignment film to another state, and time required for such transition may take about 15 ms.

Figure 1:
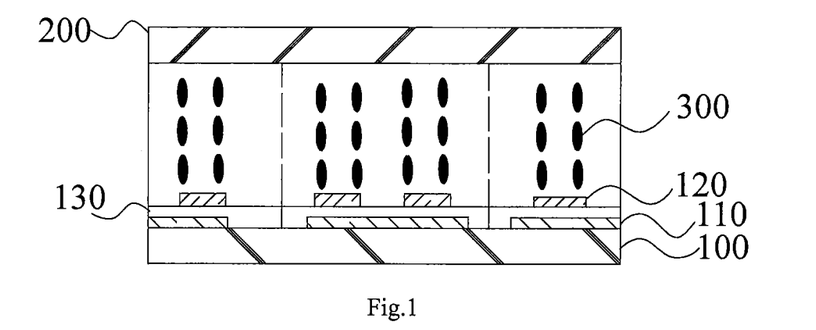
FIG. 1 is a partial structural view of a display panel according to an embodiment of the present disclosure.

In other words, the response time of liquid crystal molecules when they are deflected under the effect of an electric field is relatively long, which is an important factor causing the slow response speed when a display device displays an image. The inventors of the present application tried to improve the response speed of the liquid crystal molecules by adjusting the shapes of the electrodes, the spacing between the electrodes, the arrangement of the liquid crystal molecules, etc. while keeping the electrode structure (that is, the relative position between the common electrode 120 and the pixel electrode 110) in the display panel as shown in FIG. 3 unchanged. The inventors of the present application have found that, for a liquid crystal display panel having a common electrode and a pixel electrode as shown in FIG. 1 or FIG. 3, the response time of the liquid crystal molecules can be improved and the image switching speed can be increased by setting the azimuth angle of the liquid crystal molecules.

According to the embodiment of the present disclosure, the liquid crystal molecules have an azimuth angle of 90 degree, thereby enabling the liquid crystals to have faster response speed. Herein, the "azimuth angle" mentioned and the "pretilt angle" mentioned below are parameters for describing an initial state of the liquid crystal. That is, the initial state of the liquid crystal molecules in space can be determined using these two angles. In general, the pretilt angle of a liquid crystal molecule refers to a tilt angle of the long axis direction of the liquid crystal molecule in the initial state with respect to the plane of the liquid crystal display panel (base substrate), and the azimuth angle of the liquid crystal molecule reflects an angle between the long axis direction of the liquid crystal molecules in the initial state and the rubbing direction for the alignment film.

Figure 5:
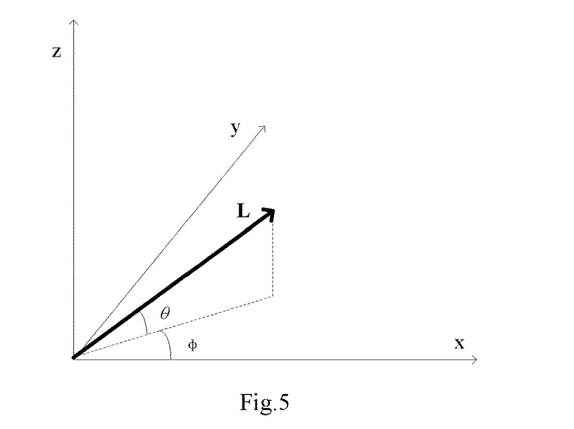
FIG. 5 illustrates the azimuth angle and the pretilt angle of liquid crystal molecules.

The meanings of the azimuth angle and the pretilt angle of the liquid crystal molecule will be illustrated below with reference to FIG. 5. As shown in FIG. 5, the x-axis in the figure represents the rubbing direction for the alignment film, and the plane defined by the x-axis and the y-axis is parallel to the plane in which the liquid crystal display panel (base substrate) resides. The z-axis in the figure is perpendicular to the x-y plane. A thick solid line L with an arrow in the figure represents the long axis direction of a single liquid crystal molecule. The azimuth angle $\varphi$ shown in FIG. 5 is an angle between the orthographic projection of the long axis L of the liquid crystal molecule in the initial state on the base substrate of a display panel and the rubbing direction of the alignment film, that is, an angle between the orthographic projection of the long axis on the x-y plane and the x-axis. The pretilt angle $\theta$ of the liquid crystal molecule is a tilt angle of the long axis direction of the liquid crystal molecule in the initial state with respect to the x-y plane.

Figure 6:
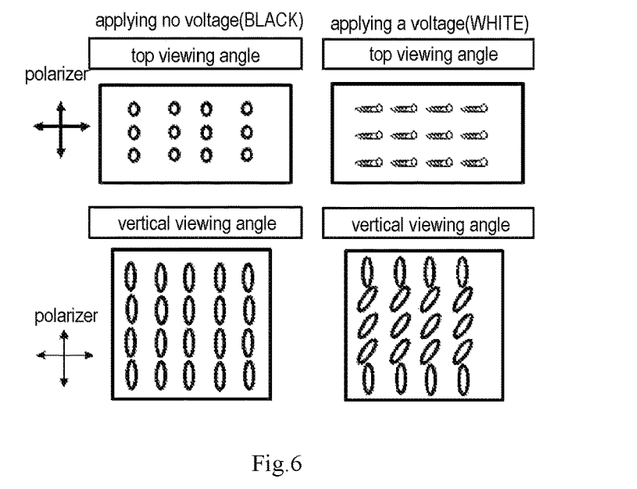
FIG. 6 illustrates deflection of liquid crystal molecules in a display panel according to an embodiment of the present disclosure under the influence of an electric field.

FIG. 6 illustrates a partial cross-sectional view of a liquid crystal display panel according to another embodiment of the present disclosure. FIG. 6 intends to illustrate the states of the liquid crystal molecules in the liquid crystal display panel shown in FIG. 4 before and after a voltage is applied. Moreover, FIG. 4 or FIG. 6 illustrates deflection of the liquid crystal molecules by taking a normally black mode liquid crystal display panel as an example.

Figure 4:
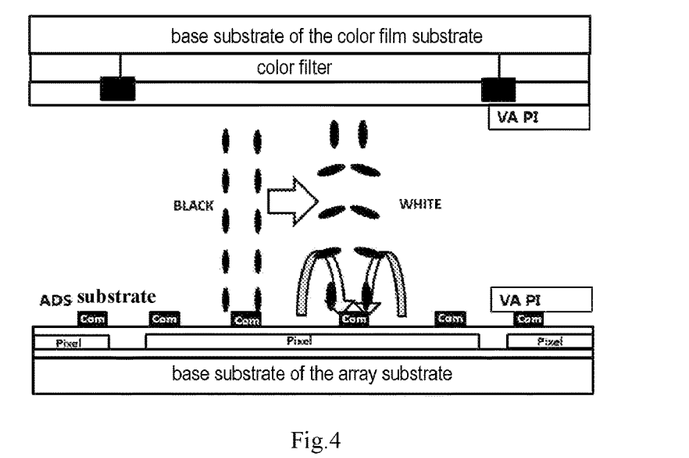
FIG. 4 is a partial structural view of a display panel according to another embodiment of the present disclosure.

In the example of FIG. 4 or FIG. 6, the azimuth angle of the liquid crystal molecules is 90 degree. In case no voltage is applied (at that time, the liquid crystal display panel is in a dark state, indicated by BLACK shown in FIG. 4 and FIG. 6), the liquid crystals are vertically arranged as a whole (the vertically arranged here means that the long axis direction of the liquid crystal molecules is perpendicular to the rubbing direction for the alignment film), and light from the backlight cannot pass through the liquid crystal layer. When a voltage is applied, the pixel electrode (Pixel as indicated in FIG. 4) and the common electrode (Corn as indicated in FIG. 4) form an electric field as shown by the curves with arrows in FIG. 4, the liquid crystal molecules move from an initial vertical direction (perpendicular to the rubbing direction for the alignment film) to a horizontal direction, and light from the backlight can pass through the liquid crystal layer (at that time, the liquid crystal display panel is in a bright state, indicated by WHITE shown in FIG. 4 and FIG. 6). A schematic view illustrating the orientation of liquid crystal molecules at different viewing angles in the bright state (WHITE) and the dark state (BLACK) is shown in FIG. 6. Those skilled in the art can understand that the display panel may further comprise a color filter, a black matrix (e.g., indicated by a black square on the substrate of the color film substrate shown in FIG. 4), and an alignment film (indicated by VA PI shown in FIG. 4) disposed between the substrate of the color film substrate and the substrate of the array substrate for defining the arrangement direction of the liquid crystal molecules, and the like.

The inventors of the present application have researched and recognized basic elastic constants and related performance parameters of liquid crystal molecules in a liquid crystal display panel in different operation modes. As shown in Table 1, the basic elastic constants of liquid crystals comprise a splaying elastic constant $K_{11}$, a torsional elastic constant $K_{22}$ and a bending elastic constant $K_{33}$, $K_{33}>K_{11}>K_{22}$. When the liquid crystals are in an operation mode of "vertical rotation", the elastic constant $K_{33}$ thereof is larger than the elastic constant in other operation modes. The "vertical rotation" mentioned here means that the liquid crystal molecules start to rotate from an initial vertical state, that is, the azimuth angle of the liquid crystal molecules is 90 degree. "Horizontal rotation" means that the liquid crystal molecules start to rotate from an initial horizontal state (the azimuth angle is 0 degree). Since the basic elastic constant $K_{33}$ is relatively larger, time required for the liquid crystal molecules to perform vertical rotation is shorter. Accordingly, the response time for the liquid crystal display panel to perform image display is also shortened, so that the display device exhibits a faster response speed when displaying an image, achieving a better image switching effect.

TABLE 1 basic elastic constants and display performance of liquid crystal molecules

| | splaying $K_{11}$ | torsional $K_{22}$ | bending $K_{33}$ |
| --- | --- | --- | --- |
| operation mode | horizontal rotation | torsional rotation | vertical rotation |
| elastic constant | medium | small | large |
| driving voltage | medium | low | high |
| response time | medium | long | short |

According to some embodiments of the disclosure, the base substrate of the array substrate 100 comprises a plurality of sub-pixel regions arranged in an array (a single sub-pixel region is shown, for example, as a region surrounded by a dotted line in FIG. 1), the common electrode comprises a plurality of electrode blocks, and each of the sub-pixel regions is provided with one pixel electrode and at least two electrode blocks. For example, FIG. 3 also illustrates a partial sectional view of the display panel corresponding to a single sub-pixel region. As shown in FIG. 3, each sub-pixel region is provided with one pixel electrode 110 and two electrode blocks 120A and 120B. This can further improve the ability of the electric field formed by the pixel electrode and the common electrode to control the liquid crystal molecules in the sub-pixel region. In some embodiments, each electrode block of the common electrode 120 may be a strip electrode, and the orthographic projections of the at least two electrode blocks in a single pixel region on the substrate 100 are located at edges of the sub-pixel region and fall within the orthographic projection of the pixel electrode 110 on the substrate 100, as shown in FIG. 1 or FIG. 3. This enables the liquid crystal molecules 300 in the sub-pixel region to be subjected to the electric field as much as possible formed by the pixel electrode and the respective electrode blocks of the common electrode, which can further improve the ability to control the liquid crystal molecules.

According to other embodiments of the disclosure, the common electrode comprises a plurality of electrode blocks, each of the sub-pixel regions is provided with one pixel electrode and one electrode block, and each electrode block has at least one hollow portion. That is, in this example, the electrode blocks of the common electrode are in one-to-one correspondence with the sub-pixel regions. Taking the partial sectional view of the display panel shown in FIG. 3 as an example, in this case, the structures 120A and 120B shown in FIG. 3 may be connected to each other as a non-hollow portion of a single electrode block, and the portion between the structures 120A and 120B is a hollow portion of the electrode block. Further, in this example, outer edges of the orthographic projections of the portions (e.g. structures 120A and 120B) other than the hollow portion of each electrode block on the substrate 100 are located at edges of the sub-pixel region and fall within the orthographic projection of the pixel electrode 110 on the substrate 100, thereby further improving the ability of the electric field to control the liquid crystal molecules. It can be understood that, in these embodiments, since a single electrode block is a hollow electrode, the orthographic projection of the single electrode block on the substrate also has a hollow portion. The outer edges of the orthographic projections of the portions other than the hollow portion of each electrode block on the substrate define the overall profile of the electrode block. In an embodiment, the outer edges of the orthographic projections of the portions other than the hollow portion of each electrode block on the substrate may coincide with the edges of the sub-pixel region, or may be as close as possible to the edges of the sub-pixel region.

According to an embodiment of the present disclosure, the common electrode 120 and the pixel electrode 110 may be disposed on the same side of the substrate 100. According to the embodiment shown in FIG. 1 or FIG. 3 of the present disclosure, the common electrode 120 and the pixel electrode 110 may be disposed on a side of the substrate 100 facing the liquid crystal molecules. The pixel electrode 110 is closer to the substrate 100 than the common electrode 120, and an insulating planarization layer (e.g., 130 as shown in FIG. 1) is disposed between the common electrode and the pixel electrode. This can further improve the ability to control the liquid crystal molecules.

According to an embodiment of the present disclosure, the width (L2 as shown in FIG. 3) of the pixel electrode 110, the width (L1 as shown in the figure) of each electrode block of the common electrode, and the distances (S1 and S2 as shown in the figure) between the common electrode and the pixel electrode in the vertical direction are not particularly limited. According to a specific embodiment of the present disclosure, S1 and S2 may be equal, the length of the pixel electrode 110 may be 1 to 8 µm, and the length of the common electrode may be 2 µm. The above parameters may be adjusted according to the size of the display panel, the requirements for PPI, etc.

In addition, the inventors of the present application have found that, for the liquid crystal display panels provided in the foregoing embodiments, the pretilt angle of the liquid crystal molecules also has a certain effect on the performance (including the response speed) of the liquid crystal display device. For example, the pretilt angle of the liquid crystal molecules would affect the transmittance of the display panel in a dark state, the driving voltage for driving the liquid crystal molecules to be deflected, and the response speed of the liquid crystal molecules. In the case where the pretilt angle of the liquid crystal molecules is too small (for example, less than 45 degree), the light transmittance of the liquid crystal display panel in a dark state is high, and even light leakage occurs. However, a small pretilt angle is advantageous for improving the response speed of the liquid crystal molecules. In order to balance the light leakage problem of the liquid crystal display panel in a dark state and the response speed of the liquid crystal molecules, in some embodiments, the liquid crystal molecules have a pretilt angle of 85-90 degree. As an example, when the liquid crystal molecules have a pretilt angle of 87 degree and an azimuth angle of 90 degree, a faster response speed of the display panel can be achieved and the light leakage phenomenon of the liquid crystal display panel in a dark state can be mitigated.

Figure 10:
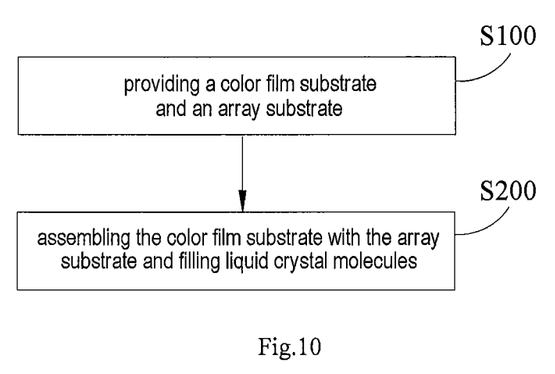
FIG. 10 is a flow chart of a method for manufacturing a display panel according to an embodiment of the present disclosure.

Referring to FIG. 10, in another aspect of the present disclosure, the present disclosure proposes a method for manufacturing a display panel. According to an embodiment of the disclosure, the method for manufacturing a display panel comprises the following steps:

S100: providing a color film substrate and an array substrate. According to an embodiment of the disclosure, in this step, an array substrate provided with a pixel electrode and a common electrode, and a color film substrate may be provided. The array substrate may have the same structure as the array substrate in the display panel described above, and details are not described here again. The specific structure of the color film substrate is not particularly limited, and those skilled in the art can make selection as needed.

S200: assembling the array substrate with the color film substrate and filling liquid crystal molecules therein. According to an embodiment of the present disclosure, in this step, the array substrate is assembled with the color film substrate and liquid crystal molecules are filled therein. The liquid crystal molecules have an azimuth angle of 90 degree. As a result, the manufactured display panel can have a faster response speed and is applicable to scenarios that require fast and frequent image switching. For specific principles, reference may be made to the foregoing embodiments of the display panel, and details will not be repeated here.

In the following, fitting tests are performed on the response time of a display device having the above-described display panel according to an embodiment of the present disclosure.

Figure 7:
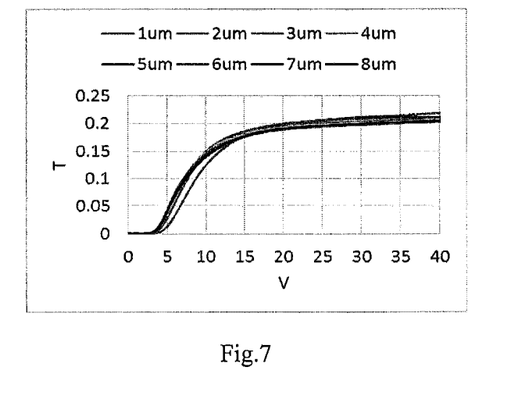
FIGS. 7-9 show simulation tests of response time of display panels according to some embodiments and comparative examples of the present disclosure.
Figure 8:
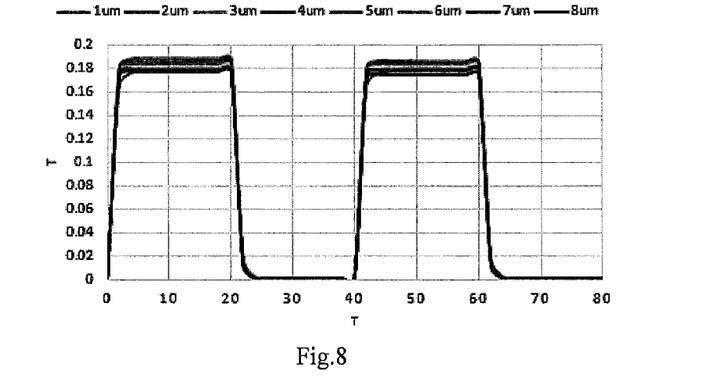
Figure 9:
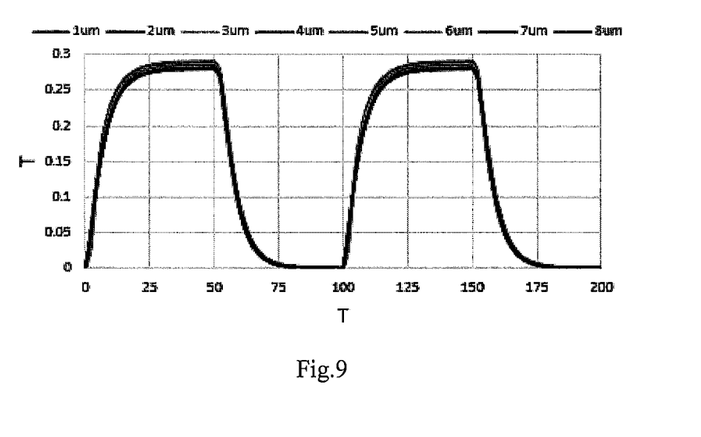

In several examples of simulation tests, the electrode structure in the display panel is shown in FIG. 3. In the simulation tests, the width L1 of the electrode block of the common electrode is 2 µm, the width (L2) of the pixel electrode is set to 1 to 8 µm, respectively (1 µm, 2 µm, 3 µm, 4 µm, 5 µm, 6 µm, 7 µm and 8 µm), and S1=S2. In multiple examples of testing, for display panels having pixel electrodes with different widths L2, only the azimuth angles of the liquid crystal molecules are different, and other parameters are similar for the different examples. For example, the pretilt angle for all the liquid crystal molecules is 87 degree. The simulation results are shown in FIG. 7 to FIG. 9. FIG. 7 illustrates a variation curve of the transmittance (T) of the liquid crystal layer with the driving voltage V. Moreover, FIG. 7 illustrates a plurality of curves corresponding to display devices having different pixel electrode widths. It can be seen that the width L2 of the pixel electrode does not have a significant influence on the transmittance of a display device. In particular, when the driving voltage is between 15V and 20V, the transmittances of display devices comprising pixel electrodes of different widths tend to be uniform, which is about 20%. FIG. 8 and FIG. 9 illustrate variation curves of the transmittance of the liquid crystal layer over time under different azimuth angles of the liquid crystal molecules. In FIG. 8, the azimuth angle of the liquid crystal molecules is 90 degree, and in FIG. 9, the azimuth angle of the liquid crystal molecules is 0 degree. By comparing FIG. 8 with FIG. 9, it can be determined that when the azimuth angle of the liquid crystal molecules is 90 degree, the display device has a shorter response time.

Tests are performed on Tr time and Tf time (Tr is the time required for a screen brightness to rise from 10% to 90%, and Tf is the time required for the screen brightness to decrease from 90% to 10%) in two liquid crystal arrangement modes described above. Details are shown in Table 2 below.

TABLE 2

| Comparison of response time in different arrangements of liquid crystal molecules | | |
|---|---|---|
| | horizontal arrangement | vertical arrangement |
| Tr | 13.834 ms | 1.64254 ms |
| Tf | 12.909 ms | 1.7232 ms |
| RT | 26.743 ms | 3.36574 ms |

It can be seen that when the azimuth angle of the liquid crystal molecules is 90 degree (e.g., vertical arrangement with respect to the rubbing direction of the alignment film), the response speed is notably faster than that in the circumstance where the azimuth angle of the liquid crystal molecules is 0 degree (e.g., horizontal arrangement). As shown in Table 2, the response time RT (Tr+Tf) in the vertical arrangement mode is 3.3 ms, and the response time in the horizontal arrangement mode is 26 ms.

In the present description, the description with reference to the terms "an embodiment", "another embodiment", and the like means that specific features, structures, materials or characteristics described in conjunction with the embodiment are included in at least one embodiment of the present disclosure. In this specification, the schematic description of the above terms is not necessarily directed to the same embodiment or example. Moreover, the specific features, structures, materials, or characteristics described may be combined in any suitable manner in any one or more embodiments or examples. In addition, without causing any contradiction, those skilled in the art may combine different embodiments or examples and features of the different embodiments or examples described in this specification.

Although some embodiments of the present disclosure have been illustrated and described above, it can be understood that the above-described embodiments are exemplary and should not be construed as limiting the present disclosure. A person having an ordinary skill in the art can make variations, amendments, replacements and modifications to the above-described embodiments within the scope of the disclosure. These variations, amendments, replacements and modifications all fall within the scope of the present application.

The invention claimed is:

1. A display panel, comprising:
    an array substrate;
    a color film substrate on the array substrate; and
    liquid crystal molecules sealed between the array substrate and the color film substrate,
    wherein the array substrate comprises a pixel electrode and a common electrode,
    wherein orthographic projections of the pixel electrode and the common electrode on a base substrate of the array substrate comprise an overlapping region,
    wherein an azimuth angle of the liquid crystal molecules is 90 degrees,
    wherein the display panel further comprises an alignment film between the array substrate and the color film substrate, the alignment film is configured to define an arrangement direction of the liquid crystal molecules,
    wherein the azimuth angle is an angle between an orthographic projection of a long axis of each of the liquid crystal molecules in an initial state on the base substrate and a rubbing direction of the alignment film, and
    wherein a pretilt angle of the liquid crystal molecules is 85 to 87 degrees, the pretilt angle comprises a tilt angle of the long axis of each of the liquid crystal molecules in the initial state with respect to a plane of the display panel.

2. The display panel according to claim 1,
    wherein the base substrate of the array substrate comprises a plurality of sub-pixel regions arranged in an array,
    wherein the common electrode comprises a plurality of electrode blocks, and
    wherein each of the plurality of sub-pixel regions has one pixel electrode and at least two electrode blocks.

3. The display panel according to claim 2,
    wherein the pixel electrode comprises a plate-like electrode,
    wherein an electrode block of the plurality of electrode blocks comprises a strip electrode, and
    wherein orthographic projections of the at least two electrode blocks on the base substrate are at edges of a sub-pixel region of the plurality of sub-pixel regions and fall within an orthographic projection of the pixel electrode on the base substrate.

4. The display panel according to claim 1,
    wherein the base substrate of the array substrate comprises a plurality of sub-pixel regions arranged in an array,
    wherein the common electrode comprises a plurality of electrode blocks,
    wherein each of the sub-pixel regions has one pixel electrode and one electrode block, and
    wherein each electrode block comprises at least one hollow portion.

5. The display panel according to claim 4, wherein outer edges of orthographic projections of portions other than the at least one hollow portion of each electrode block on the base substrate are at edges of a sub-pixel region of the plurality of sub-pixel regions and fall within an orthographic projection of the pixel electrode on the base substrate.

6. The display panel according to claim 1, wherein the common electrode and the pixel electrode are on a same side of the base substrate of the array substrate.

7. The display panel according to claim 6, wherein the common electrode and the pixel electrode are on a side of the base substrate facing the liquid crystal molecules,
    wherein the pixel electrode is closer to the base substrate than the common electrode, and
    wherein an insulating planarization layer is between the common electrode and the pixel electrode.

8. The display panel according to claim 1, wherein a pretilt angle of the liquid crystal molecules is in a range of 85 degrees to 90 degrees.

9. A display device comprising the display panel according to claim 1.

10. A method for manufacturing the display panel according to claim 1, comprising:
    providing the color film substrate and the array substrate; and
    assembling the array substrate with the color film substrate and filling the liquid crystal molecules between the array substrate and the color film substrate.

11. The display device according to claim 9,
    wherein the base substrate of the array substrate comprises a plurality of sub-pixel regions arranged in an array,
    wherein the common electrode comprises a plurality of electrode blocks, and
    wherein each of the plurality of sub-pixel regions has one pixel electrode and at least two electrode blocks.

12. The display device according to claim 11,
    wherein the pixel electrode comprises a plate-like electrode,
    wherein an electrode block of the plurality of electrode blocks comprises a strip electrode, and
    wherein orthographic projections of the at least two electrode blocks on the base substrate are at edges of a sub-pixel region of the plurality of sub-pixel regions and fall within an orthographic projection of the pixel electrode on the base substrate.

13. The display device according to claim 9,
    wherein the base substrate of the array substrate comprises a plurality of sub-pixel regions in an array,
    wherein the common electrode comprises a plurality of electrode blocks,
    wherein each of the sub-pixel regions has one pixel electrode and one electrode block, and
    wherein each electrode block comprises at least one hollow portion.

14. The display device according to claim 13, wherein outer edges of orthographic projections of portions other than the at least one hollow portion of each electrode block on the base substrate are at edges of a sub-pixel region of the plurality of sub-pixel regions and fall within an orthographic projection of the pixel electrode on the base substrate.

15. The display device according to claim 9, wherein the common electrode and the pixel electrode are on a same side of the base substrate of the array substrate.

16. The display device according to claim 15,
wherein the common electrode and the pixel electrode are on a side of the base substrate facing the liquid crystal molecules,
wherein the pixel electrode is closer to the base substrate than the common electrode, and
wherein an insulating planarization layer is between the common electrode and the pixel electrode.

* * * * *